Nov. 11, 1924.

J. SCHURCH 1,515,076

ELECTRICALLY DRIVEN WHEEL FOR MOTOR VEHICLES

Filed July 31, 1922  3 Sheets-Sheet 1

INVENTOR:
JACOB SCHURCH,
BY
Graham T Harris
ATTORNEYS.

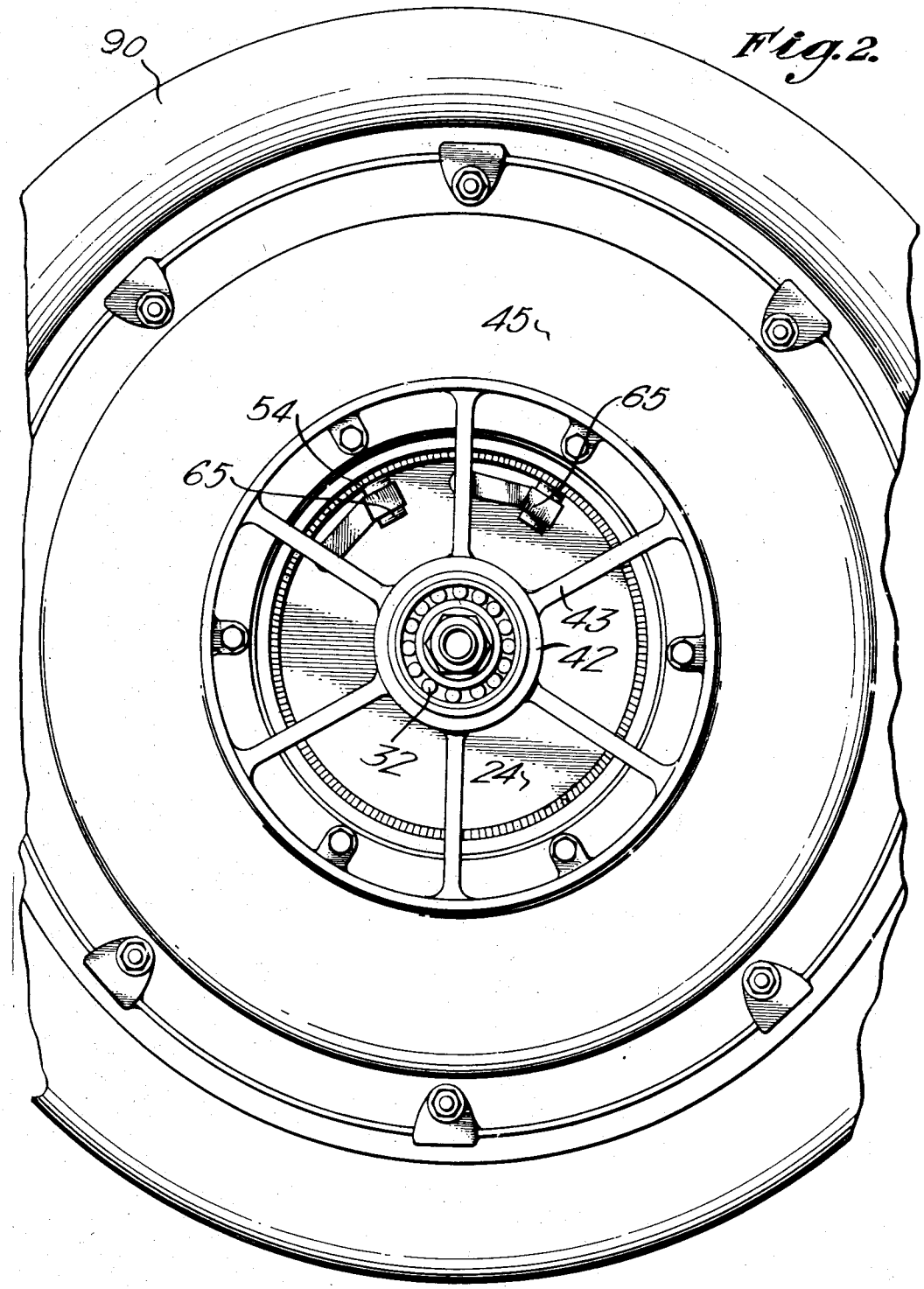

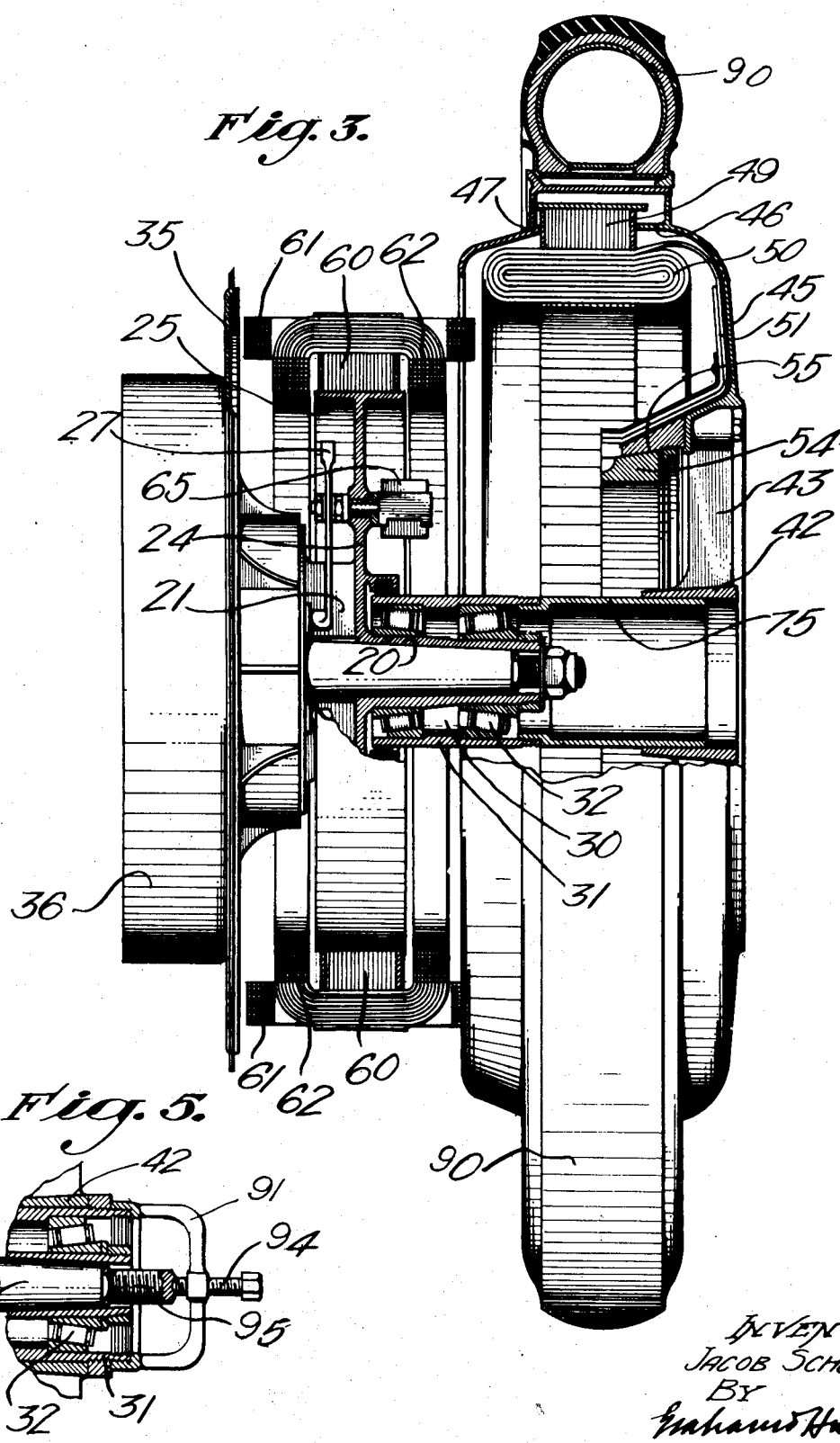

Patented Nov. 11, 1924.

1,515,076

UNITED STATES PATENT OFFICE.

JACOB SCHURCH, OF LOS ANGELES, CALIFORNIA, ASSIGNOR OF ONE-HALF TO WILLIAM H. HEISE, OF LOS ANGELES, CALIFORNIA.

ELECTRICALLY-DRIVEN WHEEL FOR MOTOR VEHICLES.

Application filed July 31, 1922. Serial No. 578,841.

*To all whom it may concern:*

Be it known that I, JACOB SCHURCH, a citizen of the United States, residing at Los Angeles, in the county of Los Angeles and State of California, have invented a new and useful Electrically-Driven Wheel for Motor Vehicles, of which the following is a specification.

My invention relates to electrically driven vehicles and is more particularly an electrically driven wheel adapted to use with automobiles.

It is an object of the invention to provide an improved form of vehicle wheel having an electric motor incorporated therein as a means for turning the wheel and thus driving the vehicle.

It is a further object of the invention to provide an electrically driven wheel which may be used upon either the right or left side of a vehicle without the necessity of changing the motor connections.

It is also an object of the invention to provide in such a vehicle wheel a means for preventing the passage of oil and other foreign substances into the coil chamber.

It is also an object to provide a wheel structure which may be dismantled without disturbing the bearing members.

It is also an object to provide a wheel of such construction that it may be dismantled without danger of injury to any of the parts thereof.

The specific advantages and further objects of my invention will be made evident herinafter.

Referring to the drawings which are for illustrative purposes only,

Fig. 2 is a fragmentary face view of the wheel with the hub cap thereof removed.

Fig. 3 is a view similar to Fig. 1 showing the manner in which the rotatable parts of the wheel may be removed from the stationary parts by the use of the extension member I employ.

Fig. 5 is a fragmentary sectional view showing the manner in which the wheel puller is applied for the purpose of removing the entire wheel structure.

Figure 1:
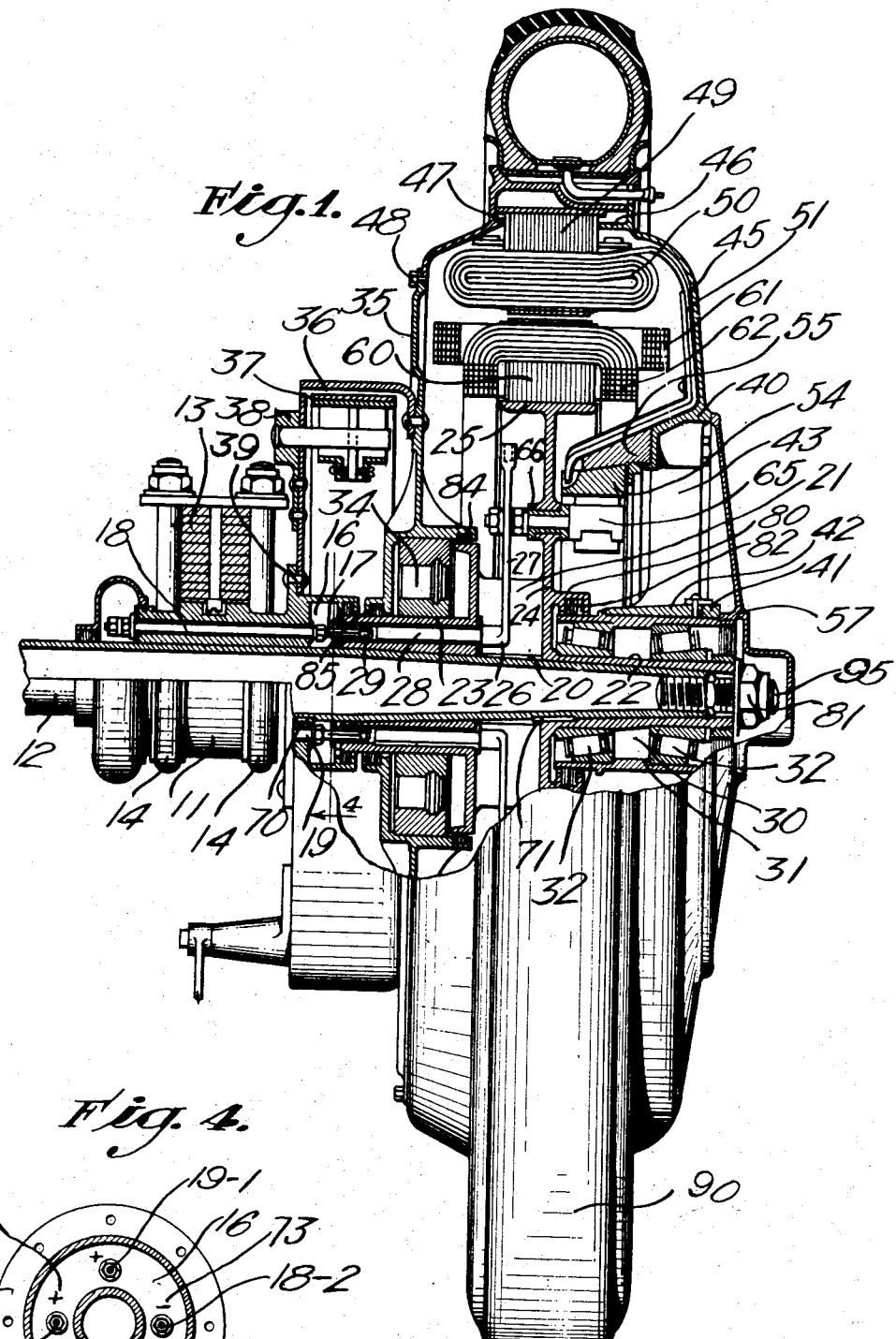
Fig. 1 is a partially sectioned elevational view of a vehicle wheel embodying the features of my invention.

As shown in the drawings my invention employs a spring block 11 adapted to be secured near the end of an axle 12 so as to furnish a means whereby the axle and the wheel may be mounted upon a suitable spring member 13 by U bolts 14 which rest in grooves provided in the spring block. The outwardly disposed end of the block 11 is provided with an annular recess 16 in which the ends 17 of connector studs $18^1$, $19^1$, $18^2$, and $19^2$ are situated. The ends 17 are divided or split so as to make them compressible.

Upon the tapered portion 20 of the shaft 12 a stator casting 21 fits, this casting providing a cylindrical forward shell 22 and a rearward cylindrical extension 23 which project axially from a central web 24 upon the periphery of which a flange 25 is formed. The extension 23 is connected to the web 24 by means of radial webs 26 between which spaces are provided for connecter arms 27 which extend from the inner ends of the connecter rods 28 insulated through the cylindrical extension 23. The inner end of each of the connecter rods 28 is recessed as indicated at 29 so that it may receive the compressible end 17 of one of the connecter studs 18 or 19.

Upon the forwardly extending extension 22 of the casting 21 a bearing member 30 is installed. This bearing member comprises a cylindrical sleeve 31 which encloses two sets of roller bearings 32. It will be perceived that the sleeve 31 is permitted to rotate freely about the extension 22 and is adapted to form an integral part of the stator member which is comprised principally of the stator casting 21. A roller bearing 34 surrounds the extension 23 and is adapted to support a disk member 35 which comprises a part of the rotor element of the wheel. Riveted concentrically upon the disk 35 is a brake drum 36 which encloses brake shoes 37 mounted upon a plate 38 which is riveted at 39 to the spring block 11, in accordance with standard automobile construction.

Upon the sleeve 31 of the bearing 30 a primary rotor casting 40 is held by means of a ring nut 41. This casting 40 provides a sleeve 42 which fits snugly over the sleeve 31 and has arms 43 integrally formed therewith which support the outer dish shaped portion 45 of the casting 40. Between the outer edge 46 of the casting 40 and the secondary rotor casting 47 which bolts at 48 to the disk 35, armature punchings 49 are clamped, these punchings carrying coils 50 having leads 51 which extend radially across the inside of the dish portion 45 of the casting 40 to commutator segments 54 which are mounted inside a commutator ring 55 which is bolted concentrically upon the inside of the casting 40.

Upon the flange 25 of the stator casting 21 field punchings 60 which carry field coils 61 and compensator winding 62 are mounted. Brushes 65 are mounted upon the outwardly disposed surface of the web 24 by means of studs 66 which are insulated through the web, and through which studs and certain of the connector arms 27 and connector rods 28 connection is preferably made with the connector studs $18^1$ and $18^2$, the connections to the field windings being made through those arms 27 which are connected with the connector studs $19^1$ and $19^2$ This method of connection constitutes one of the features of my invention.

It will be perceived that the connector studs $19^1$ and $19^2$ lie in a vertical plane and are in alignment with the key 70 which prevents the rotation of the spring block 11 upon the shaft 12, and further, that the connector studs $18^1$ and $18^2$ lie in a horizontal plane or in other words a plane perpendicular to the plane passing through the studs $19^1$ and $19^2$ and the key 70. A wheel mounted upon the right hand side of a vehicle rotates in a clockwise direction when the vehicle is travelling forwardly, while a wheel mounted upon the left hand side rotates in an anti-clockwise direction when the vehicle travels forwardly. It will, therefore, be understood that in order to make the wheels interchangeable, it is necessary to provide a means whereby the direction in which they are rotated may be changed when they are transferred from one side of the vehicle to the other. In direct current motors a change in the direction of rotation may be accomplished by reversing the direction of the flow of current through either the field windings or the armature windings. This must be done separately as a change in direction of the current in both the field windings and the armature windings would give the same relation of magnetic action therebetween, with the result that the direction of rotation would remain unchanged.

Figure 4:
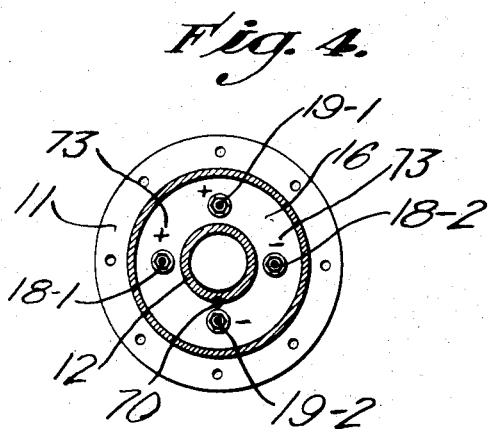
Fig. 4 is a face view of the spring block showing the disposal of the connection posts in the recess provided in the face thereof.

As shown in Fig. 4 the studs $19^1$ and $19^2$ lie in a plane with the key 70 and therefore the connector bars 28 adapted to connect therewith will always be of the same polarity whether placed upon the right or left side of the vehicle owing to the fact that the key 71 which secures the casting 21 against rotation is in alignment with the key 70. Considering that the arrangement of connector studs, shown in Fig. 4, is upon the right hand side of a vehicle, the stud $18^2$ would therefore be situated ahead of the stud $18^1$. Considering the plus and minus signs 73, it will be noticed that the connector rods 28 which makes connection with the stud $18^2$ therefore connects with a negative element, when the wheel is upon the right side of the vehicle, but makes connection with a plus or positive element when the wheel is transferred to the left side of the vehicle. Thus it will be perceived that the direction of current through one of the sets of windings is accomplished and the direction of rotation of the wheel reversed to suit whichever side of the vehicle the wheel is utilized upon, the polarity of the connector studs $19^1$ and $19^2$ remaining constant.

A particular advantage in the use of the bearing construction I employ makes it possible to remove the armature from the field of the motor without it being necessary to remove the entire wheel structure from the axle This removal is accomplished without danger or damage to any of the windings by use of the extension sleeve 75 which is shown in use in Fig. 3. When it is desired to remove the rotor castings 40 and 47 which sustain the armature, bolts 48 are removed so as to disconnect the casting 47 from the disc 35 and the hub plate 57 is unscrewed from the face of the casting 40. The ring nut 41 is then removed from the bearing sleeve 31 and the extension 75 screwed into the sleeve 31 as shown in Fig. 3. The casting 40 and the parts attached thereto may then be moved outwardly upon the extension 75 into the position shown in Fig. 3 in which the field windings are entirely exposed, or if desired the casting 21 and its associated parts may be entirely removed from the extension 75. Without the employment of the extension a great deal of care would be necessary to prevent the casting 21 from dropping off the end of the sleeve 31, after it has been moved outwardly thereupon, bringing the armature and field windings together with the result of their being bent or otherwise damaged due to the considerable weight of the rotor element of the wheel.

A very pronounced improvement resides in the construction of the forward bearing 30 which permits the casting 40, which it supports, to be removed without disturbing the rollers or the interior of the bearing in any way. The taking down and replacing of the bearing itself would constitute a very considerable portion of the entire work of dismounting or dismantling the wheel. With my present improved type of construction the wheel may be either dismantled or removed entirely from the axle 12 without disturbing the bearings, thus eliminating expenditure of labor in taking down, replacing, and readjusting the bearings.

My invention also provides a means whereby grease from the bearings 30 and 34 is retained in the bearings and thus prevented from working down into the commutator or the chamber in which the windings are situated. A cylindrical lip 80 extends outwardly from the web 24 over the inner end of the sleeve 31 and felt washers 82 are placed between the lip 80 and the sleeve as shown to provide a grease or oil seal, for preventing the passage of grease outwardly into the outer structure of the wheel. Washers 84 and 85 are placed between the inner extension 23 and the disk 35 so that grease contained in the bearings 34 will not work out into the windings chamber.

Although I illustrate my invention as an automobile wheel upon which a pneumatic tire 90 is mounted, it is not in any way restricted to such purposes but may have a very broad scope of application.

The entire wheel structure may be easily removed by employing the wheel puller 91 shown in Fig. 5. When it is desired to remove the wheel, the hub plate 57 is first removed, and then the nut 81 which retains the casting 21 upon the shaft. The wheel puller may then be screwed upon the sleeve 31 and the pressure of the drive screw 94 applied to the end of the shaft screw 95 whereupon the casting 21 will be pulled from the tapered end 20 of the shaft 12, the connector rods 28 at this time coming out of contact with the ends 17 of the connector studs. It will be perceived that the ends 17 lie within the recess 16 in which they are protected by the surrounding walls from being bent or broken.

I claim as my invention:

1. In a device of the class described, the combination of: a stator member comprised of a central radial web having a forward and a rearward cylindrical extension extending axially therefrom, said extensions forming a concentric bore adapted to receive a shaft; a bearing member rotatably mounted upon said forward cylindrical extension; a forward rotor member removably mounted upon said bearing member, so as to permit the removal of said rotor member without disturbing said bearing member; and a rearward rotor member, rotatably mounted upon said rearward extension and having connection with said forward rotor member at the periphery thereof.

2. In a device of the class described, the combination of: a stator member comprised of a central radial web having a forward and a rearward cylindrical extension extending axially therefrom, said extensions forming a concentric bore adapted to receive a shaft; a bearing member rotatably mounted upon said forward cylindrical extension; a forward rotor member removably mounted upon said bearing member, so as to permit the removal of said rotor member without disturbing said bearing member; a rearward rotor member, rotatably mounted upon said rearward extension and having connection with said forward rotor member at the periphery thereof; and means for preventing the escape of lubricant from said bearing member.

3. In a device of the class described, the combination of: a stator member comprised of a central radial web having a forward and a rearward cylindrical extension extending axially therefrom, said extensions forming a concentric bore adapted to receive a shaft; a bearing member rotatably mounted upon said forward cylindrical extension; a forward rotor member removably mounted upon said bearing member, so as to permit the removal of said rotor member without disturbing said bearing member; a rearward bearing member upon said rearward cylindrical extension; and a rearward rotor member supported upon said rearward bearing member.

4. In a device of the class described, the combination of: a stator member comprised of a central radial web having a forward and a rearward cylindrical extension extending axially therefrom, said extensions forming a concentric bore adapted to receive a shaft; a bearing member rotatably mounted upon said forward cylindrical extension; a forward rotor member removably mounted upon said bearing member, so as to permit the removal of said rotor member without disturbing said bearing member; a rearward bearing member upon said rearward cylindrical extension; a rearward rotor member supported upon said rearward bearing member; and means for preventing the escape of lubricant from said bearing members.

5. In a device of the class described, the combination of: a stator member comprised of a central radial web having a forward and a rearward cylindrical extension extending axially therefrom, said extensions forming a concentric bore adapted to receive a shaft; a sleeve surrounding said forward cylindrical extension; a bearing, disposed between said sleeve and said forward cylindrical extension, permitting the rotation of said sleeve; a forward rotor member removably mounted upon said sleeve; and a rearward motor member rotatably mounted upon said rearward extension and having connection with said forward rotor member at the periphery thereof.

6. In a device of the class described, the combination of: a stator member comprised of a central radial web having a forward and a rearward cylindrical extension extending axially therefrom, said extensions forming a concentric bore adapted to receive a shaft; a sleeve surrounding said forward cylindrical extension; a bearing, disposed between said sleeve and said forward cylindrical extension, permitting the rotation of said sleeve; a forward rotor member removably mounted upon said sleeve; a cap adapted to close the forward end of said sleeve; means between the inner end of said sleeve and said stator member for preventing the escape of lubricant from said sleeve; and a rearward rotor member, rotatably mounted upon said rearward extension and having connection with said forward rotor member at the periphery thereof.

7. In a device of the class described, the combination of: a stator member having a central bore; a rotor member substantially enclosing said stator member; magnetic means disposed between said stator member and said rotor member whereby said rotor member may be rotated; a shaft received in said central bore; a stationary member upon said shaft, in a position adjacent to said stator member, having a recess in the end thereof surrounding said shaft and facing said stator member; conductor plugs disposed within said recess; insulated means for supporting said conductor plugs in said recess and for providing connection of said plugs to an external circuit; a cylindrical extension projecting from said stator member into said recess; receptacles insulated in said cylindrical extension for receiving said conductor plugs; and means for connecting said receptacles with said magnetic means.

8. In a device of the class described, the combination of: a stator member having a central bore; a rotor member substantially enclosing said stator member; magnetic means disposed between said stator member and said rotor member whereby said rotor member may be rotated; a shaft received in said central bore; a stationary member upon said shaft, in a position adjacent to said stator member, having a recess in the end thereof facing said stator member; conductor plugs disposed within said recess; insulated means for supporting said conductor plugs in said recess and for providing connection of said plugs to an external circuit; an extension projecting from said stator member into said recess; receptacles insulated in said cylindrical extension for receiving said conductor plugs; and means for connecting said receptacles with said magnetic means.

9. In a device of the class described, the combination of: a stator member comprised of a central radial web having a forward and a rearward cylindrical extension extending axially therefrom, said extensions forming a concentric bore adapted to receive a shaft; a sleeve surrounding said forward cylindrical extension; a bearing, disposed between said sleeve and said forward cylindrical extension, permitting the rotation of said sleeve; a forward rotor member removably mounted upon said sleeve; an extension adapted to be joined to the outer end of said sleeve upon which said forward rotor member may be moved to a position clear of said stator member; and a rearward rotor member, rotatably mounted upon said rearward extension and having connection with said forward rotor member at the periphery thereof.

10. In a device of the class described, the combination of: a stator member comprised of a central radial web having a forward and a rearward cylindrical extension extending axially therefrom, said extensions forming a concentric bore adapted to receive a shaft; a sleeve surrounding said forward cylindrical extension; a bearing, disposed between said sleeve and said forward cylindrical extension, permitting the rotation of said sleeve; a forward rotor member removably mounted upon said sleeve; a cap adapted to close the forward end of said sleeve; means between the inner end of said sleeve and said stator member for preventing the escape of lubricant from said sleeve; an extension of substantially the same diameter as said sleeve adapted to be joined to the outer end of said sleeve, upon which extension said forward rotor member may be moved to a position clear of said stator member; and a rearward rotor member, rotatably mounted upon said rearward extension and having connection with said forward rotor member at the periphery thereof.

In testimony whereof, I have hereunto set my hand at Los Angeles, California, this 26th day of July, 1922.

JACOB SCHURCH.